(12) United States Patent
Peng et al.

(10) Patent No.: US 12,008,003 B2
(45) Date of Patent: Jun. 11, 2024

(54) METHOD FOR IDENTIFYING QUESTIONS WITH SAME SEMANTICS AND ELECTRONIC DEVICE

(71) Applicant: Huawei Technologies Co., Ltd., Shenzhen (CN)

(72) Inventors: Zhengyuan Peng, Shenzhen (CN); Chuanfei Xu, Shenzhen (CN); Chao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 151 days.

(21) Appl. No.: 17/764,002

(22) PCT Filed: Sep. 10, 2020

(86) PCT No.: PCT/CN2020/114565
§ 371 (c)(1),
(2) Date: Mar. 25, 2022

(87) PCT Pub. No.: WO2021/057499
PCT Pub. Date: Apr. 1, 2021

(65) Prior Publication Data
US 2022/0391400 A1    Dec. 8, 2022

(30) Foreign Application Priority Data
Sep. 27, 2019  (CN) .......................... 201910927801.5

(51) Int. Cl.
*G06F 16/00*  (2019.01)
*G06F 16/2457*  (2019.01)
*G06F 16/26*  (2019.01)

(52) U.S. Cl.
CPC ........ *G06F 16/24578* (2019.01); *G06F 16/26* (2019.01)

(58) Field of Classification Search
None
See application file for complete search history.

(56) References Cited

U.S. PATENT DOCUMENTS 6,766,320 B1      7/2004  Wang et al.
10,861,022 B2 *  12/2020  Gupta .................. G06F 40/166
(Continued)

FOREIGN PATENT DOCUMENTS

CN   105608199 A    5/2016
CN   108733723 A   11/2018
(Continued)

*Primary Examiner* — Debbie M Le
(74) *Attorney, Agent, or Firm* — Conley Rose, P.C.

(57) ABSTRACT

A method for identifying questions with same semantics includes creating a user behavior graph based on at least two user logs; determining a first associated question node set based on the user behavior graph and a seed question; calculating, based on the first associated question node set, association scores of questions corresponding to all question nodes in the user behavior graph; using a question corresponding to each associated question node in the first associated question node set as a new seed node, to determine M second associated question node sets; updating, based on the M second associated question node sets, the association scores of the questions corresponding to all the question nodes in the user behavior graph; and determining K questions with top K association scores based on updated association scores of the questions corresponding to all the question nodes in the user behavior graph.

20 Claims, 8 Drawing Sheets

(56) References Cited

U.S. PATENT DOCUMENTS

| | | | |
|---|---|---|---|
| 10,891,952 B2* | 1/2021 | Froelich | G10L 25/87 |
| 11,249,992 B2* | 2/2022 | Vertsel | G06F 16/24522 |
| 11,295,213 B2* | 4/2022 | Mei | G06F 40/35 |
| 11,381,528 B2* | 7/2022 | Koga | G06F 16/9532 |
| 11,483,263 B2* | 10/2022 | Guo | H04L 51/216 |
| 11,531,858 B2* | 12/2022 | Khabiri | G06F 16/24522 |
| 11,651,236 B2* | 5/2023 | Li | G06F 40/279 |
| | | | 706/46 |
| 11,682,390 B2* | 6/2023 | Temkin | G10L 15/22 |
| | | | 704/275 |
| 2012/0016661 A1 | 1/2012 | Pinkas | |
| 2016/0180237 A1* | 6/2016 | Ahuja | G06N 5/022 |
| | | | 706/52 |
| 2020/0074342 A1* | 3/2020 | Karasawa | G06N 3/08 |

FOREIGN PATENT DOCUMENTS

| | | |
|---|---|---|
| CN | 108984633 A | 12/2018 |
| CN | 109063152 A | 12/2018 |
| CN | 109492077 A | 3/2019 |
| CN | 110209768 A | 9/2019 |

* cited by examiner

METHOD FOR IDENTIFYING QUESTIONS WITH SAME SEMANTICS AND ELECTRONIC DEVICE

CROSS-REFERENCE TO RELATED APPLICATIONS

This is a U.S. National Stage of International Patent Application No. PCT/CN2020/114565 filed on Sep. 10, 2020, which claims priority to Chinese Patent Application No. 201910927801.5, filed on Sep. 27, 2019. Both of the aforementioned applications are hereby incorporated by reference in their entireties.

TECHNICAL FIELD

This application relates to the field of data mining technologies, and in particular, to a method for identifying questions with same semantics and an electronic device.

BACKGROUND

A user log records behavior data (for example, accessing, browsing, search, and tapping) generated each time a user accesses the Internet. Many pieces of information may be obtained by analyzing the user log. For example, a ranking list of questions searched for by the user, time for which the user stays on a page, and duration in which the user listens to a song may be calculated. Because questions with same semantics have a same answer (or result), mining questions in the user log that express same semantics is of great significance to analyzing the user log. However, because a same question may be expressed in many different manners, users have various expressions for a same thing or similar things, and even some expressions may have errors and ambiguities, it is quite challenging to accurately find different expressions of a same question from user logs.

For example, in a smart home device (for example, a smart speaker or a large screen) and an intelligent assistant system, user questions include a large quantity of questions with same semantics. Taking a smart speaker of a brand as an example, a total quantity of top 1000 hotspot questions is more than 80% of a total quantity of all questions. However, because these hotspot questions have a plurality of different expressions, it is quite difficult to accurately identify questions with same semantics. For another example, in an intelligent customer service system, many frequently asked questions are stored in the form of frequently asked questions (frequently asked questions, FAQ). When a match degree between a user question and an FAQ is relatively high, an answer of the FAQ answer may be returned to a user to resolve the user question. When a user question does not match any FAQ, O&M personnel need to determine whether the question is a new question or a different expression of an FAQ question, resulting in quite high manpower costs. Therefore, currently, a problem that accuracy of identifying questions with same semantics urgently needs to be resolved.

SUMMARY

Embodiments of this application provide a method for identifying questions with same semantics and an electronic device, to resolve a problem that accuracy of identifying questions with same semantics is low.

According to a first aspect, an embodiment of this application provides a method for identifying questions with same semantics. The method includes: creating a user behavior graph based on at least two user logs; determining a first associated question node set based on the user behavior graph and a seed question, where the first associated node set includes a question node corresponding to the seed question and M associated question nodes, and M is a positive integer; and the seed question is a question in the at least two user logs; calculating, based on the first associated question node set, association scores of questions corresponding to all question nodes in the user behavior graph; using a question corresponding to each associated question node in the first associated question node set as a new seed node, to determine M second associated question node sets; updating, based on the M second associated question node sets, the association scores of the questions corresponding to all the question nodes in the user behavior graph; and determining K questions with top K association scores based on updated association scores of the questions corresponding to all the question nodes in the user behavior graph, where K is an integer greater than 1.

In this embodiment of this application, mining is performed based on questions and answers in existing user logs, and K questions with top K association scores may be determined through a plurality of rounds of association processes. The K questions with the top K association scores have same or similar semantics. Even if the questions in the user logs are quite colloquial and are expressed quite differently, the method can effectively improve accuracy of identifying questions with same semantics. Further, identifying questions with same semantics can improve a semantic understanding capability of an intelligent device.

In a possible design, each user log includes at least a user identifier, at least one question, and at least one answer corresponding to each question. In the user behavior graph, an $i^{th}$ user node corresponds to a user identifier in an $i^{th}$ user log, and the $i^{th}$ user node is separately connected to at least one question node; the at least one question node corresponds to at least one question in the $i^{th}$ user log, and a $j^{th}$ question node in the at least one question node is separately connected to at least one answer node; the at least one answer node corresponds to at least one answer that is in the $i^{th}$ user log and that corresponds to the $j^{th}$ question node; and i and j are positive integers, the $i^{th}$ user log is any one of the at least two user logs, and the $j^{th}$ question node is any one of the at least one question node.

In the foregoing design, the user behavior graph accurately describes an association relationship between a user identifier, a question, and an answer, to help identify questions with same semantics.

In a possible design, each user log at least includes at least one question and at least one answer corresponding to each question. In the user behavior graph, at least one question node in an $i^{th}$ user log corresponds to at least one question in the $i^{th}$ user log, and a $j^{th}$ question node in the at least one question node is separately connected to at least one answer node; the at least one answer node corresponds to at least one answer that is in the $i^{th}$ user log and that corresponds to the $j^{th}$ question node; and i and j are positive integers, the $i^{th}$ user log is any one of the at least two user logs, and the $j^{th}$ question node is any one of the at least one question node.

In the foregoing design, the user behavior graph accurately describes an association relationship between a question and an answer, to help identify questions with same semantics.

In a possible design, the user behavior graph further includes a value marked on an edge connecting each question node and a corresponding answer node; and a value marked on an edge connecting the $j^{th}$ question node and an $n^{th}$ answer node represents a quantity of times of using an answer corresponding to the $n^{th}$ answer node to answer a question corresponding to the $j^{th}$ question node, where n is a positive integer, and the $n^{th}$ answer node is any one of the at least one answer node.

In the foregoing design, the user behavior graph can reflect a quantity of times of using each answer to answer a corresponding question, to help identify questions with same semantics.

In a possible design, the determining a first associated question node set based on the user behavior graph and a seed question, where the first associated node set includes the seed node and M associated question nodes may be implemented in the following method: determining a first associated answer node set based on the user behavior graph, where the first associated answer node set includes at least one answer node connected to the question node corresponding to the seed question; and using, as an associated question node, a question node other than the question node corresponding to the seed question in question nodes connected to an answer node in each of first associated answer nodes, to determine the M associated question nodes.

The foregoing design can determine an associated question node related to the seed node, to implement a first round of association process.

In a possible design, an association score of a question corresponding to a first question node is calculated based on the following values: a value marked on an edge connecting the question node corresponding to the seed question and each answer node in the first associated answer node set and a value marked on an edge connecting the first question node and a first associated answer node. In the first associated question node set, the first question node is any associated question node in the first associated question node set, and the first associated answer node is connected to the question node corresponding to the seed question, and is connected to the first question node.

In the foregoing design, an association score of each question node is calculated based on a value marked on an edge connecting a question and an answer, so that an association between questions can be reflected.

In a possible design, the updating, based on the M second associated question node sets, the association scores of the questions corresponding to all the question nodes in the user behavior graph may be implemented, for example, in the following method: updating, based on the M second associated question node sets and the association scores of the questions corresponding to all the question nodes in the user behavior graph, the association scores of the questions corresponding to all the question nodes in the user behavior graph.

The foregoing design can stabilize an association score of each question as soon as possible.

In a possible design, before the determining K questions with top K association scores based on updated association scores of the questions corresponding to all the question nodes in the user behavior graph, the method further includes: determining that a difference between an updated association score of each question and an association score that is of each question and that exists before the update is less than a preset threshold.

The foregoing design can improve accuracy of identifying questions with same semantics.

According to a second aspect, an embodiment of this application provides a device, including one or more processors and a memory. The memory stores program instructions, and when the program instructions are executed by the device, the method in any one of the first aspect and the possible designs of the first aspect in embodiments of this application is implemented.

According to a third aspect, an embodiment of this application provides a chip. The chip is coupled to a memory in a device, so that when running, the chip invokes program instructions stored in the memory, to implement the method in any one of the first aspect and the possible designs of the first aspect in embodiments of this application.

According to a fourth aspect, an embodiment of this application provides a computer storage medium. The computer storage medium stores program instructions, and when the program instructions run on an electronic device, the device performs the method in any one of the first aspect and the possible designs of the first aspect in embodiments of this application.

According to a fifth aspect, an embodiment of this application provides a computer program product. When the computer program product runs on an electronic device, the electronic device is enabled to perform the method according to the first aspect and any possible design of the first aspect in embodiments of this application.

In addition, for technical effects brought by any possible design manner in the second aspect to the fifth aspect, refer to technical effects brought by different design manners in the method part. Details are not described herein again.

DESCRIPTION OF EMBODIMENTS

Figure 1A:
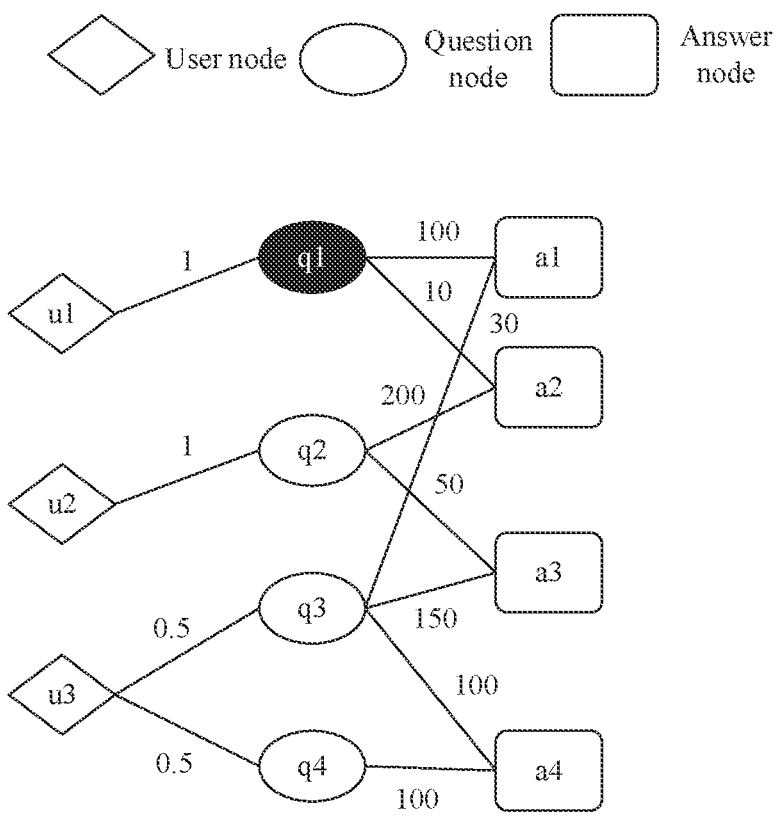
FIG. 1(a) is a user behavior graph 1 according to this application.

The following describes embodiments of this application with reference to accompanying drawings.

A plurality of solutions for identifying questions with same semantics are provided in the conventional technology. The following uses only Solution 1 and Solution 2 as examples for brief description.

Solution 1: Keyword-based matching method. In the method, a seed question (or referred to as an initial expression) is first selected, latent semantic analysis (for example, keyword extraction or word weight calculation) is performed on the seed question, and then a retrieval algorithm (for example, BM25 or cosine similarity) is applied to search a candidate question set for a similar question of the seed question. For example, if a match degree score of a question in the candidate question set is greater than a threshold, the question is used as a similar question of the seed question. Solution 1 is relatively simple, but accuracy of identifying questions with same semantics is relatively low.

Solution 2: Deep learning-based text matching method. In the method, a seed question is also first selected, a text of the seed question is converted into a word vector through semantic analysis, then question matching is converted into vector similarity calculation, and a similar question is determined from a candidate question set through vector similarity calculation. Solution 2 has higher accuracy than Solution 1. However, because users ask questions quite colloquially, and the questions are expressed quite differently, accuracy of identifying questions with confusing semantics is low.

For example, there are three questions (q1, q2, and q3), detailed as follows:

q1: Play it, OK?
q2. Play the song May or May Not of Zhang Zihao, OK?
q3: Play a song, OK?

Semantics of q1 and q2 is playing the song May or May Not, and q1 and q2 are different expressions of a same question. Semantics of q3 is recommending a song, and is different from the semantics of q1 and q2. However, regardless of whether Solution 1 or Solution 2 is used, an obtained result is that a match degree between q1 and q3 is far higher than a match degree between q1 and q2, because keywords and word vectors of q1 and q3 are quite similar, and keywords and word vectors of q1 and q2 are relatively different. Neither Solution 1 nor Solution 2 can find that the two questions have same semantics.

Based on this, embodiments of this application provide a method for identifying questions with same semantics. In the method, mining may be performed based on questions and answers in existing user logs, and K questions with top K association scores may be determined through a plurality of rounds of association processes. The K questions with the top K association scores have same or similar semantics. Even if the questions in the user logs are quite colloquial and are expressed quite differently, the method can effectively improve accuracy of identifying questions with same semantics. Further, identifying questions with same semantics can improve a semantic understanding capability of an intelligent device. For example, if a smart speaker determines that a question asked by a user is one of the K questions, the smart speaker may determine that semantics of the question is equivalent to that of the other (K-1) questions. Therefore, the intelligent device can accurately understand the semantics of the question, and further provide an answer desired by the user. For another example, software with an intelligent customer service system is installed on a personal notebook computer. If the intelligent customer service system determines that a question entered by a user is one of the K questions, the intelligent customer service system can accurately understand semantics of the question, determine a standard expression corresponding to the question, and push an answer corresponding to the standard expression to the user.

It should be understood that embodiments of this application may be applied to a plurality of electronic devices with voice control functions, for example, a smart speaker, a large screen, a mobile phone, a tablet computer, a personal notebook computer, a wearable device, and a vehicle-mounted device. The large screen refers to an electronic device with a relatively large screen. In addition, embodiments of this application may be further applied to software with an intelligent customer service system.

In embodiments of this application, each user log includes at least one or more questions and one or more answers corresponding to each question. Optionally, each user log may further include a user identifier. It should be understood that the user identifier herein may be an identifier of a real user, or may be an identifier of a virtual user. All users asking a same question that are obtained based on a statistical result of big data may be used as one virtual user.

For another example, a user log 1 includes: a question 1 is "Play it, OK?", an answer of the question 1 is "Song Mav or May Not", a question 2 is "Play the song May or May Not of Zhang Zihao, OK?", and an answer of the question 2 is "Song May or May Not"; and a user log 2 includes: a question is "Play a song, OK?", an answer 1 of the question is "Song May or May Not", and an answer 2 of the question is "Song A Good Day".

For example, a user log 1 includes: a user identifier is a user identifier A, a question is "Play it, OK", and an answer is "Song May or May Not"; a user log 2 includes: a user identifier is a user identifier B, a question is "Play the song May or May Not of Zhang Zihao, OK?", and an answer is "Song May or May Not"; and a user log 3 includes: a user identifier is a user identifier C, a question is "Play a song, OK?", an answer 1 is "Song May or May Not", and an answer 2 is "Song A Good Day".

It should be understood that each question may have different answers. For example, if a question is "Recommend a nice song", answers of the question may be different songs. On the contrary, one answer may also correspond to different questions. For example, if an answer is "Song Snowy Hair", a question may be "Play a song of Jay Chou", or a question may be "Play a song of a Chinese style".

Further, a user behavior graph may be created based on at least two user logs.

In a possible design, the user behavior graph includes a total of three types of nodes: a user node, a question node, and an answer node. Specifically, the user behavior graph may be created in the following manner:

For each user log, a user identifier corresponds to one user node, each question corresponds to one question node, each answer corresponds to one answer node, the user node is connected to each question node, and each question node is connected to a corresponding answer node. An $i^{th}$ user log is used as an example. It is assumed that the $i^{th}$ user log includes a user identifier and k questions. A $j^{th}$ question in the k questions corresponds to s answers, and i, j, k, and s are positive integers. In the user behavior graph, an $i^{th}$ user node corresponds to the user identifier in the $i^{th}$ user log, the k questions correspond to k question nodes, the $i^{th}$ user node is separately connected to the k question nodes, a $j^{th}$ question node in the k question nodes corresponds to the $j^{th}$ question in the k questions, the s answers corresponding to the $j^{th}$ question correspond to s answer nodes, and the $j^{th}$ question node is separately connected to the s answer nodes.

In the user behavior graph, a value marked on an edge connecting a user node and a question node represents a weight of the question in all questions in a user log to which the question belongs. For example, if a value marked on an edge connecting a user node and a question node is 1, it indicates that a weight of a question corresponding to the question node in all questions in a user log to which the question belongs is 1, in other words, the user log includes only one question. For another example, if a value marked on an edge connecting a user node and a question node is 0.5, it indicates that a weight of a question corresponding to the question node in all questions in a user log to which the question belongs is 0.5, in other words, the user log includes two questions.

In the user behavior graph, a value marked on an edge connecting a question node and an answer node represents a quantity of times a user uses the answer. It should be understood that when a user identifier is an identifier of a real user, a value marked on an edge connecting a question node and an answer node represents a quantity of times the real user uses the answer: or when a user identifier is an identifier of a virtual user, a value marked on an edge connecting a question node and an answer node represents a sum of quantities of times all users asking the question that are obtained based on a statistical result of big data use the answer.

The following uses a smart speaker as an example. The smart speaker may determine, based on the following rule, whether a user uses the answer.

1. It is determined whether the user has played, for more than preset duration, a program (for example, music) indicated by the answer. If the user has played the program for more than preset duration, it is recorded that the user uses the answer; otherwise, no recording may be performed.

For example, in a scenario of the smart speaker, a question 1 is "Play a song of Jay Chou", and the smart speaker plays a song Snowy Hair (answer 1). If play of the song is completed, it is recorded once that the answer 1 is used, or if duration of playing the song exceeds preset duration (for example, one minute or 30 seconds), it is recorded once that the answer 1 is used.

It is determined whether the user has a new question request within short time (for example, 10 seconds). If yes, it is considered that the user does not use the answer.

3. It is determined whether the user has a voice request with negative emotions (for example, you are stupid, you are silly, or you made a mistake) after the answer is returned. If yes, it is considered that the user does not use the answer.

It should be understood that the foregoing rule used to determine whether the user uses an answer is merely an example, and does not constitute a limitation on this application.

FIG. 1(a) shows a user behavior graph created based on three user logs. A user log 1 records that a user u1 asks a question q1, and two answers corresponding to q1 are a1 and a2. A user log 2 records that a user u2 asks a question q2, and two answers corresponding to q2 are a2 and a3. A user log 3 records that a user u3 asks questions q3 and q4, three answers corresponding to q3 are a1, a3, and a4, and one answer corresponding to q4 is a4. Specifically, u1 is connected to q1, and q1 is separately connected to a1 and a2. Because the user log 1 includes only q1, a value 1 is marked on an edge connecting u1 and q1. A value 100 is marked on an edge connecting q1 and a1, to indicate that the user u1 uses a1 100 times, and a value 10 is marked on an edge connecting q1 and a2, to indicate that the user u1 uses a2 10 times. The user u2 is connected to q2, and q2 is separately connected to a2 and a3. Because the user log 2 includes only q2, a value 1 is marked on an edge connecting u2 and q2. A value 200 is marked on an edge connecting q2 and a2, to indicate that the user u2 uses a2 200 times, and a value 50 is marked on an edge connecting q2 and a3, to indicate that the user u2 uses the answer a3 to answer q2 50 times. The user u3 is separately connected to q3 and q4, q3 is separately connected to a1, a3, and a4, and q4 is connected to a4. Because the user log 3 includes q3 and q4, a value 0.5 is marked on an edge connecting u3 and q3, and a value 0.5 is marked on an edge connecting u3 and q4. A value 30 is marked on an edge connecting q3 and a1, to indicate that the user u3 uses a1 30 times, a value 150 is marked on an edge connecting q3 and a3, to indicate that the user u3 uses a3 150 times, a value 100 is marked on an edge connecting q3 and a4, to indicate that the user u3 uses a4 100 times, and a value 100 is marked on an edge connecting q4 and a4, to indicate that the user u3 uses a4 100 times.

In another possible design, the user behavior graph includes a total of two types of nodes: a question node and an answer node. Specifically, the user behavior graph may be created in the following manner:

For each user log, each question corresponds to one question node, each answer corresponds to one answer node, and each question node is connected to a corresponding answer node. An $i^{th}$ user log is used as an example. It is assumed that the $i^{th}$ user log includes a user identifier and k questions. A $j^{th}$ question in the k questions corresponds to s answers, and i, j, k, and s are positive integers. It should be understood that in this case, the $i^{th}$ user log may not include the user identifier. In the user behavior graph, the k questions correspond to k question nodes, a $j^{th}$ question node in the k question nodes corresponds to the $j^{th}$ question in the k questions, the s answers corresponding to the $j^{th}$ question correspond to s answer nodes, and the $j^{th}$ question node is separately connected to the s answer nodes.

Figure 1B:
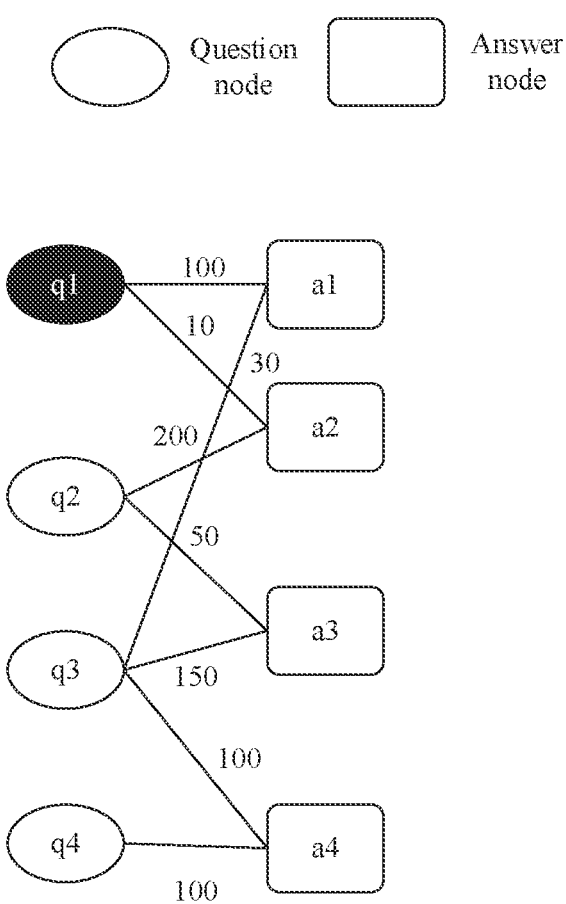
FIG. 1(b) is a user behavior graph 2 according to this application.

FIG. 1(b) shows a user behavior graph created based on three user logs. A user log 1 records a question q1 and two answers a1 and a2 corresponding to q1. A user log 2 records a question q2 and two answers a2 and a3 corresponding to q2. A user log 3 records questions q3 and q4, three answers a1, a3, and a4 corresponding to q3, and one answer a4 corresponding to q4. Specifically, q1 is separately connected to a1 and a2. A value 100 is marked on an edge connecting q1 and a1, to indicate that a1 is used, 100 times, by a user asking the question. A value 10 is marked on an edge connecting q1 and a2, to indicate that a2 is used by a user 10 times. The question q2 is separately connected to a2 and a3. A value 200 is marked on an edge connecting q2 and a2, to indicate that a2 is used by a user 200 times. A value 50 is marked on an edge connecting q2 and a3, to indicate that a3 is used by a user to answer q2 50 times. The question q3 is separately connected to a1, a3 and a4, and q4 is connected to a4. A value 30 is marked on an edge connecting q3 and a1, to indicate that a1 is used by a user 30 times. A value 150 is marked on an edge connecting q3 and a3, to indicate that a3 is used by a user 150 times. A value 100 is marked on an edge connecting q3 and a4, to indicate that a4 is used by a user 100 times. A value 100 is marked on an edge connecting q4 and a4, to indicate that a4 is used by a user 100 times.

It should be understood that the user behavior graphs shown in FIG. 1(a) and FIG. 1(b) are merely examples, and do not constitute a limitation on this application.

Based on a user behavior graph created in the foregoing manner, the following uses an example in which an electronic device is an execution body to describe how to identify questions with same semantics based on the created user behavior graph and resolve a problem that accuracy of identifying questions with same semantics is low. The electronic device may be a terminal device used by an end user, or may be a server device located on the cloud.

Embodiment 1

Figure 4:
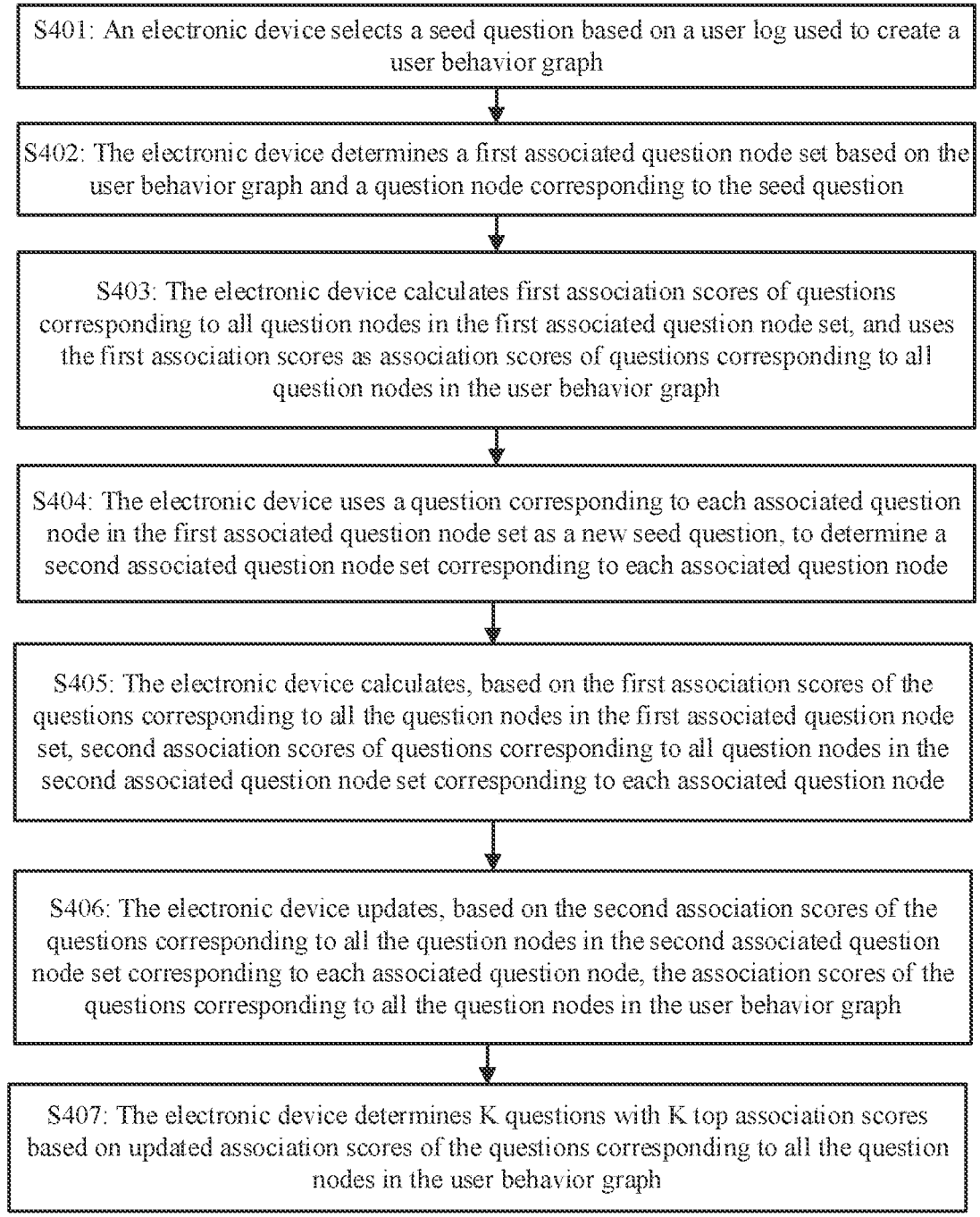
FIG. 4 is a flowchart 1 of an overview of a method for identifying questions with same semantics according to this application.

This embodiment of this application provides a method for identifying questions with same semantics. As shown in FIG. 4, the method includes the following steps.

S401: An electronic device selects a seed question based on a user log used to create a user behavior graph.

For example, the electronic device may select, as the seed question before or after creating the user behavior graph, any question included in any user log.

S402: The electronic device determines a first associated question node set based on the user behavior graph and a question node corresponding to the seed question, where the first associated question node set includes the question node corresponding to the seed question and M associated question nodes, and M is a positive integer. The M associated question nodes are question nodes found in the user behavior graph that are associated with the question node.

This is a first round of association process.

For example, the M associated question nodes may be determined by using the following method:

The electronic device determines a first associated answer node set based on the user behavior graph. The first associated answer node set includes at least one answer node connected to the question node corresponding to the seed question. The electronic device uses, as an associated question node, a question node other than the question node corresponding to the seed question in question nodes connected to an answer node in each of first associated answer nodes, to determine the M associated question nodes.

Specifically, for the first associated answer node set, if an answer node in the first associated answer node set is connected to a plurality of question nodes, all question nodes other than the question node corresponding to the seed question in the plurality of question nodes are associated question nodes, and the plurality of question nodes belong to the first associated question node set. If an answer node is connected only to the question node corresponding to the seed question, an associated question node cannot be obtained based on the answer node.

Figure 2:
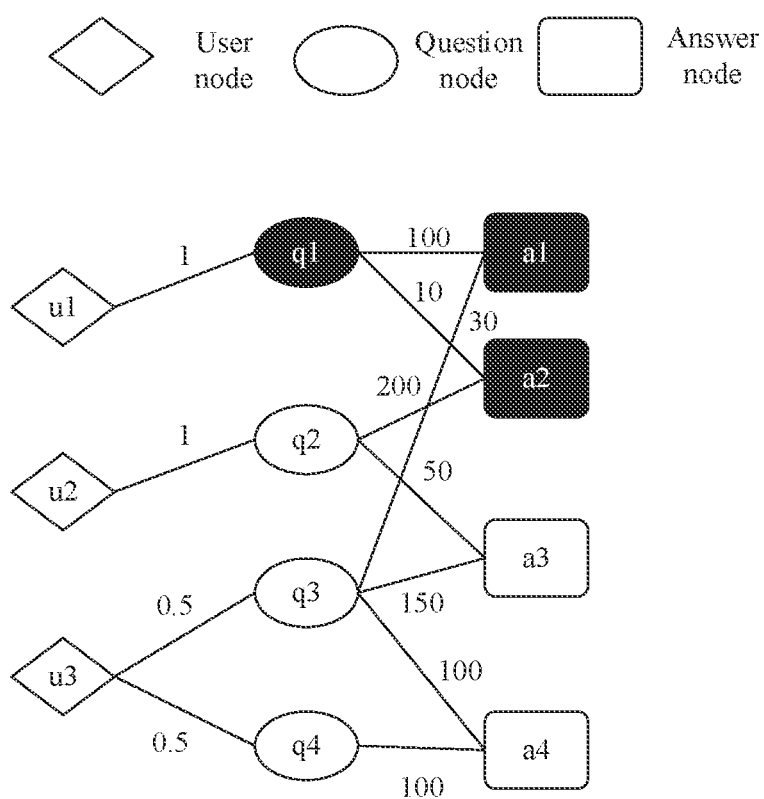
FIG. 2 is a schematic diagram of determining an answer node corresponding to a question node corresponding to a seed question based on FIG. 1(a) according to this application.
Figure 3:
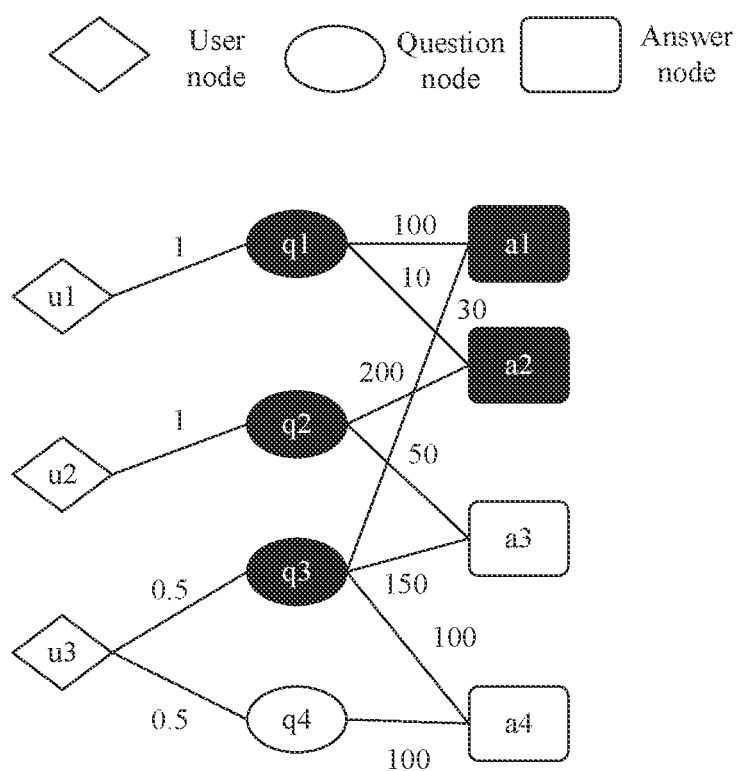
FIG. 3 is a schematic diagram of determining a first associated question node based on FIG. 1(a) according to this application.

For example, as shown in FIG. 1(a), assuming that q1 is used as the seed question, {a1, a2} are answer nodes connected to q1, as shown in FIG. 2. Further, question nodes connected to a1 further include q3, and question nodes connected to a2 further include q2, and in this case, q2 and q3 are associated question nodes, and the first associated question node set includes q1, q2, and q3, as shown in FIG. 3.

S403: The electronic device calculates first association scores of questions corresponding to all question nodes in the first associated question node set, and uses the first association scores as association scores of questions corresponding to all question nodes in the user behavior graph.

Specifically, in the first associated question node set, a first association score of the seed question is 1. A first question node is any associated question node other than the question node corresponding to the seed question in the first associated question node set, and a first associated answer node is connected to the question node corresponding to the seed question, and is connected to the first question node. A first association score of the first question node may be calculated based on the following values: a value marked on an edge connecting the question node corresponding to the seed question and each answer node in the first associated answer node set and a value marked on an edge connecting the first question node and the first associated answer node.

FIG. 1(a) is used as an example. Assuming that q1 is used as the seed question, the first associated question node set includes three question nodes: q1, q2, and q3. A first association score of a question corresponding to the question node q1 is Score(q1), a first association score of a question corresponding to the question node q2 is Score(q2), and a first association score of a question corresponding to the question node q3 is Score(q3).

Score(q1)=1, that is, the first association score of the seed question is 1.

$$Score(q2)=Pr(q2|q1)*Score(q1)=Pr(a2|q1)Pr(q2|a2)$$
$$*Score(q1)=10/(100+10)*200/(20\ 0+10)$$
$$*1=0.087.$$

Pr(q2|q1) represents a correlation between q1 and q2 on the user behavior graph, in other words, represents a score proportion of transfer from q1 to q2, Pr(a2|q1) represents a score proportion of transfer from q1 to a2, and Pr(q2|a2) represents a score proportion of transfer from a2 to q2.

Values marked on edges connecting a question node corresponding to at least one seed question and answer nodes corresponding to the question node corresponding to the seed question include a value 100 marked on an edge connecting q1 and a1 and a value 10 marked on an edge connecting q1 and a2. It is assumed that q2 is the first question node, a2 is the first answer node, and a value marked on an edge connecting the first question node and the first associated answer node is a value 200 marked on an edge connecting q2 and a2.

Similarly, the following may be obtained: Score(q3)=Pr(q3|q1)*Score(q1)=Pr(a1|q1)Pr(q3|a1)*Score(q1)=100/(100+10)*30/(100+30)*1=0 0.210.

A memory stores the first association scores of the questions corresponding to all the question nodes in the first associated question node set, that is, the association scores of the questions corresponding to all the question nodes in the user behavior graph, which is denoted as a value 1 {q1: 1.0, q2: 0.087, q3: 0.210}.

S404: The electronic device uses a question corresponding to each associated question node in the first associated question node set as a new seed question, to determine a second associated question node set corresponding to each associated question node, in other words, determine M second associated question node sets.

This is a second round of association process.

It should be understood that, for a method for using the question corresponding to each associated question node in the first associated question node set as a new seed question, to determine the second associated question node set corresponding to the associated question node, refer to S402.

For example, as shown in FIG. 1(a), assuming that q1 is the seed question, it may be learned, by performing S402, that the first associated question node set includes q1, q2, and q3. Further, if the electronic device uses q2 as a new seed question, {a2, a3} are answer nodes connected to q2. Question nodes connected to a2 further include q1, and question nodes connected to a3 further include q3, and in this case, a second associated question node set corresponding to q2 includes q1, q2, and q3. If the electronic device uses q3 as a new seed node, {a1, a3, a4} are answer nodes connected to q3. Question nodes connected to a1 further include q1, the question nodes connected to a3 further include q2, and question nodes connected to a4 further include q4, and in this case, a second associated question node set corresponding to q3 includes q1, q2, q3, and q4.

S405: The electronic device calculates, based on the first association scores of the questions corresponding to all the question nodes in the first associated question node set, second association scores of questions corresponding to all question nodes in the second associated question node set corresponding to each associated question node.

For a specific calculation method, refer to S403.

FIG. 1(a) is used as an example. Assuming that q2 is used as a new seed question, a second associated question node set corresponding to q2 includes q1, q2, and q3. Second association scores of questions corresponding to all question nodes in the second associated question node set corresponding to q2 are:

Score(q2)=0.087;

Score(q1)=Pr(q1|q2)*Score(q2)=Pr(a2|q2)Pr(q1a2)
*Score(q2)=200/(200+50)*10/(20 0+10)
*0.087=0.003; and Score(q3)=Pr(q3|q2)*Score(q2)=Pr(a3|q2)Pr(q3|a3)
*Score(q2)=50/(200+50)*150/(50+150)
*0.087=0.013.

Assuming that q3 is used as a new seed question, a second associated question node set corresponding to q3 includes q1, q2, q3, and q4. Second association scores of questions corresponding to all question nodes in the second associated question node set corresponding to Q3 are:

Score(q3)=0.210:

Score(q1)=Pr(q1|q3)*Score(q3)=Pr(a1|q3)Pr(q1|a1)
*Score(q3)=30/(150+100+30)*100/(100+30)
*0.210=0.017;

Score(q2)=Pr(q2|q3)*Score(q3)=Pr(a3|q3)Pr(q2|a3)
*Score(q3)=Pr(a3|q3)Pr(q2|a3)*S core(q3)
=150/(150+100+30)*50/(150+50)*0.210=0.028;
and Score(q4)=Pr(q4|q3)*Score(q3)=Pr(a4|q3)Pr(q4|a4)
*Score(q3)=Pr(a4|q3)Pr(q4|a4)*S core(q3)
=100/(150+100+30)*100/(100+100)
*0.210=0.038.

S406: The electronic device updates, based on the second association scores of the questions corresponding to all the question nodes in the second associated question node set corresponding to each associated question node, the association scores of the questions corresponding to all the question nodes in the user behavior graph.

For example, if a question node is an associated question node of a plurality of seed nodes, an association score of the question node is a sum of second association scores of the plurality of seed nodes.

For example, updated association scores of the questions corresponding to all the question nodes in the user behavior graph are as follows:

Score(q1)=Pr(q1|q3)*Score(q3)+Pr(q1|q2)*Score(q2)
=0.017+0.003=0.020.

Similarly, Score(q2)=0.087+0.028=0.115, Score(q3) =0.21+0.013=0.223, and Score(q4)=0.038. The updated association scores of the questions corresponding to all the question nodes in the user behavior graph are denoted by a value 2 {q1: 0.020, q2: 0.115, q3: 0.223, q4: 0.038}.

S407: The electronic device determines K questions with top K association scores based on the updated association scores of the questions corresponding to all the question nodes in the user behavior graph, where K is an integer greater than 1.

In an example, the electronic device may directly determine the K questions with the top K association scores based on the updated association scores of the questions corresponding to all the question nodes in the user behavior graph.

In another example, before the electronic device determines the K questions with the top K association scores, the electronic device may further determine, based on a difference between association scores of a question corresponding to each question node after and before the update, whether an association score of each question is stable. "Stable" herein means that no new question node is associated and a difference between an updated association score of each question and an association score that is of each question and that exists before the update is less than a preset threshold (for example, 0.001). If the association score of each question is stable, a next round of association does not need to be performed. The electronic device determines the K questions with the top K association scores based on the updated association score values of the questions corresponding to all the question nodes in the user behavior graph. If the association score of each question is unstable, a next round of association is performed, to be specific, the association scores of the questions corresponding to all the question nodes in the user behavior graph are updated based on the foregoing idea, and the electronic device determines K questions with top K association scores after determining that the association score of each question is stable.

For example, it can be learned from the value 1 {q1: 1.0, q2: 0.087, q3: 0.210} and the value 2 {q1: 0.020, q2: 0.115, q3: 0.223, q4: 0.038} that the association score of each question is unstable for the following reasons:

First: The value 1 does not include q4, but the value 2 includes q4: 0.038. Therefore, a new node is associated in the second round of association process.

Second: Assuming that the preset threshold is 0.001, because the value 1 includes q1: 1.0, and the value 2 includes q1: 0.020, a difference before and after the update is greater than 0.001. Similarly, because the value 1 includes q2: 0.087, and the value 2 includes q2: 0.115, a difference before and after the update is greater than 0.001. Similarly, because the value 1 includes q3: 0.210, and the value 2 includes q3: 0.223, a difference before and after the update is greater than 0.001. Therefore, association scores of q1, q2, and q3 are unstable. In addition, because the value 1 does not include q4, q4: 0 may be further recorded. Therefore, because the value 1 includes q4: 0, and the value 2 includes q4: 0.038 a difference before and after the update is greater than 0.001.

Therefore, based on the foregoing analysis, the electronic device needs to perform a third round of association process, and use each question node in the second associated question node set corresponding to each question node as the seed node, to determine a third associated question node set corresponding to each question node. Specifically, because the second associated question node set corresponding to q2 includes q1, q2, and q3, in the third round of association process, the electronic device uses each of q1 and q3 as the seed node to learn that a third associated question node set corresponding to q1 includes q1, q2, and q3 and that a third associated question node set corresponding to q3 includes q1, q2, q3, and q4. Similarly, because the second associated question node set corresponding to q3 includes q1, q2, q3, and q4, in the third round of association process, the electronic device uses each of q1, q2, and q4 as the seed node to learn that a third associated question node set corresponding to q2 includes q1, q2, and q3 and that a third associated question node set corresponding to q4 includes q3 and q4. The third associated question node set corresponding to q1 has been determined, and does not need to be repeatedly determined. The electronic device may update, based on the solutions of S405 and S405, the association scores of the questions corresponding to all the question nodes in the user behavior graph, and then compare updated association scores of the questions corresponding to all the question nodes in the user behavior graph and the association scores that are of the questions corresponding to all the question nodes in the user behavior graph and that are obtained in the second round of association process, to determine whether an association score of each question is stable, until the association score of each question is stable. A repeated part is not described again.

In the foregoing embodiment, accuracy of identifying questions with same semantics can be effectively improved, so that a semantic understanding capability of an intelligent device can be further improved.

It should be understood that, when a relatively small quantity of user logs are used to create a user behavior graph, a structure of the user behavior graph is relatively simple. In this case, if the method provided in Embodiment 1 is used, to be specific, the electronic device starts an association process based on a seed node, an association score of each question can be stabilized through two or more rounds of association processes. However, when a relatively large quantity of user logs are used to create a user behavior graph, a structure of the user behavior graph is relatively complex. In this case, if the method provided in Embodiment 1 is used, to be specific, the electronic device starts an association process based on a seed node, many rounds of association processes may be required to stabilize an association score of each question, and therefore, this may take a relatively long time and occupy a relatively large quantity of resources. Based on this, this application further provides a method for identifying questions with same semantics. In the method, an electronic device may start an association process based on both a seed file and at least one candidate question. When a user behavior graph is relatively complex, the foregoing method can quickly stabilize an association score of each question. For details, refer to Embodiment 2.

Embodiment 2

Figure 5:
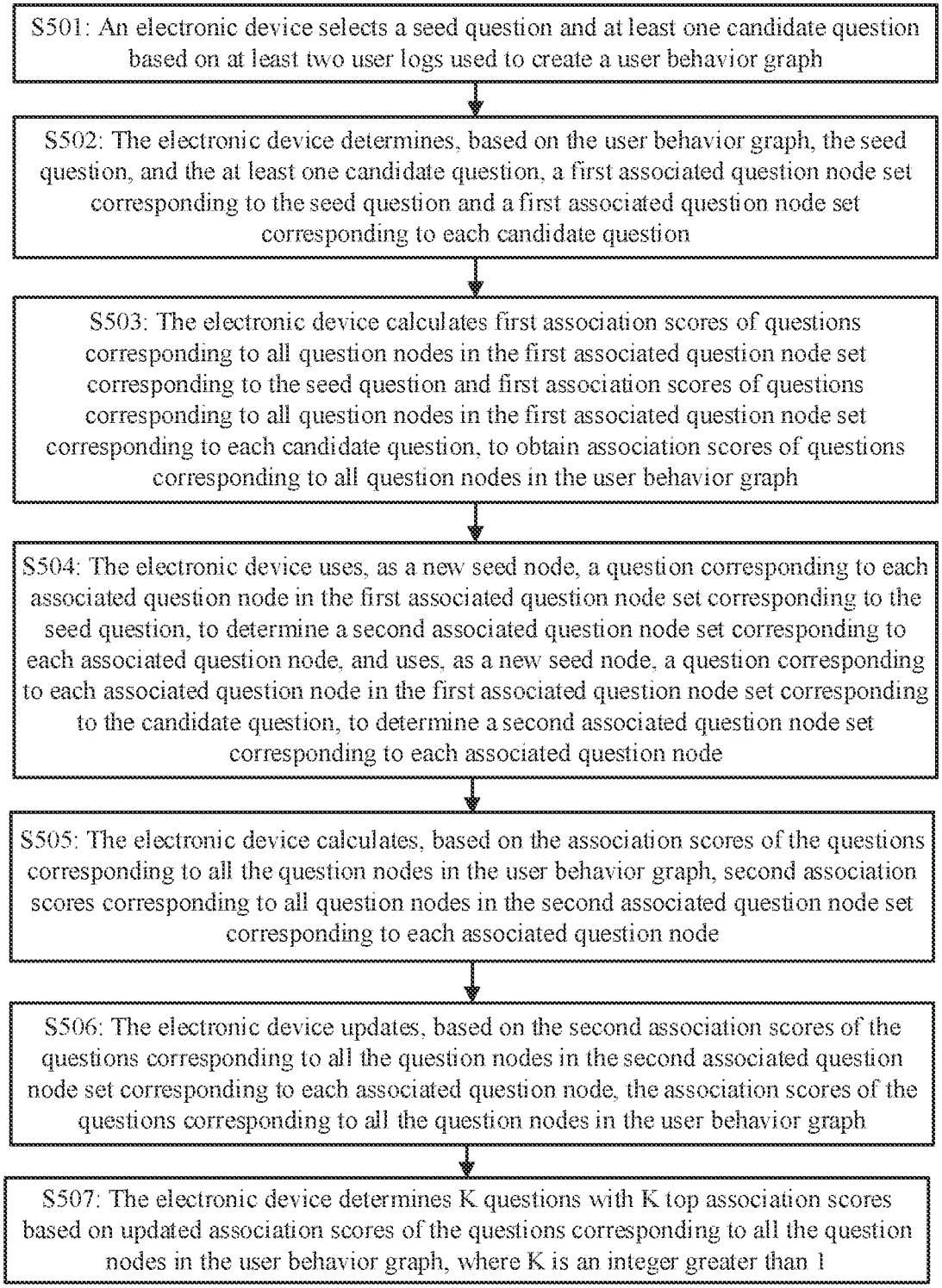
FIG. 5 is a flowchart 2 of an overview of a method for identifying questions with same semantics according to this application.

This embodiment of this application provides a method for identifying questions with same semantics. As shown in FIG. 5, the method includes the following steps.

S501: An electronic device selects a seed question and at least one candidate question based on at least two user logs used to create a user behavior graph.

For example, the electronic device may select the candidate question of the seed question by using Solution 1 and Solution 2 in the conventional technology.

For example, as shown in FIG. 1($a$), assuming that q1 is the seed question, {q3, q4} are candidate questions based on Solution 1 in the conventional technology.

It should be understood that the candidate question may be any question other than the seed question in the at least two user logs. Therefore, S501 may be alternatively described as follows: The electronic device selects a plurality of seed questions based on the at least two user logs used to create the user behavior graph.

S502: The electronic device determines, based on the user behavior graph, the seed question, and the at least one candidate question, a first associated question node set corresponding to the seed question and a first associated question node set corresponding to each candidate question.

This is a first round of association process.

It should be understood that a method for determining the first associated question node set corresponding to the seed question and a method for determining the first associated question node set corresponding to each candidate question are the same, and reference may be made to S402.

For example, as shown in FIG. 1($a$), (a1, a2) are answer nodes connected to q1. Further, question nodes connected to a1 further include q3, and question nodes connected to a2 further include q2, and in this case, a first associated question node set corresponding to q1 includes q, q2, and q3. {a1, a3, a4} are answer nodes connected to q3. The question nodes connected to a1 further include q1, question nodes connected to a3 further include q2, and question nodes connected to a4 further include q4, and in this case, a first associated question node set corresponding to q3 includes q1, q2, q3, and q4. {a4} is an answer node connected to q4. The question nodes connected to a4 further include q3, and in this case, a first associated question node set corresponding to q4 includes q3 and q4.

S503: The electronic device calculates first association scores of questions corresponding to all question nodes in the first associated question node set corresponding to the seed question and first association scores of questions corresponding to all question nodes in the first associated question node set corresponding to each candidate question, to obtain association scores of questions corresponding to all question nodes in the user behavior graph.

For details, refer to S403 and S406.

For example, the first association scores of the questions corresponding to all the question nodes in the first associated question node set corresponding to the seed question are:

Score($q1$)=1;

Score($q2$)=$Pr(q2|q1)$*Score($q$)=$Pr(a2|q1)Pr(q2|a2)$
*Score($q1$)=10/(100+10)*200/(20 0+10)
*1=0.087; and Score($q3$)=$Pr(q3|q1)$*Score($q1$)=$Pr(a1|q1)Pr(q3|a1)$
*Score($q1$)=100/(100+10)*30/(10 0+30)
*1=0.210.

First association scores of questions corresponding to all question nodes in the first associated question node set corresponding to q3 are: Score(q3)=1;

Score($q1$)=$Pr(q|q3)$*Score($q3$)=$Pr(a1|q3)Pr(q1|a1)$
*Score($q3$)=30/(150+100+30)*100/(100+30)
*1=0.081:

Score($q2$)=$Pr(q2|q3)$*Score($q3$)=$Pr(a3|q3)Pr(q2|a3)$
*Score($q3$)=$Pr(a3|q3)Pr(q2|a3)$*$S$ core($q3$)
=150/(150+100+30)*50/(150+50)*1=0.133; and Score($q4$)=$Pr(q4|q3)$*Score($q3$)=$Pr(a4|q3)Pr(q4|a4)$
*Score($q3$)=$Pr(a4|q3)Pr(q4|a4)$*$S$ core($q3$)
=100/(150+100+30)*100/(100+100)*1=0.181.

First association scores of questions corresponding to all question nodes in the first associated question node set corresponding to q4 are:

Score($q4$)=1; and

Score($q3$)=$Pr(q3|q4)$*Score($q4$)=$Pr(a4|q4)Pr(q3|a4)$
*Score($q4$)=100/(100)*100/(100+100)*1=0.5.

The association scores of the questions corresponding to all the question nodes in the user behavior graph are:

Score($q1$)=1+0.081=1.081;

Score($q2$)=0.133+0.087=0.220;

Score($q3$)=1+0.5+0.210=1.710; and

Score($q4$)=1+0.181=1.181,that is, value 1{$q1$:1.081,$q2$:0.220,$q3$:1.710,$q4$:1.181}.

S504: The electronic device uses, as a new seed node, a question corresponding to each associated question node in the first associated question node set corresponding to the seed question, to determine a second associated question node set corresponding to each associated question node, and uses, as a new seed node, a question corresponding to each associated question node in the first associated question node set corresponding to the candidate question, to determine a second associated question node set corresponding to each associated question node.

This is a second round of association process. For details, refer to S404.

S505: The electronic device calculates, based on the association scores of the questions corresponding to all the question nodes in the user behavior graph, second association scores corresponding to all question nodes in the second associated question node set corresponding to each associated question node.

For details, refer to S405.

S506: The electronic device updates, based on the second association scores of the questions corresponding to all the question nodes in the second associated question node set corresponding to each associated question node, the association scores of the questions corresponding to all the question nodes in the user behavior graph.

For details, refer to S406.

S507: The electronic device determines K questions with top K association scores based on updated association scores of the questions corresponding to all the question nodes in the user behavior graph, where K is an integer greater than 1.

It should be understood that the embodiment shown in FIG. 5 has a same basic concept as the embodiment shown in FIG. 4. In the embodiment shown in FIG. 5, the at least one candidate question is first obtained by using the seed question. Further, an association process is started for both the seed question and the at least one candidate question. Therefore, an association score of each question can be stabilized at a higher speed in comparison with Embodiment 1.

Figure 6:
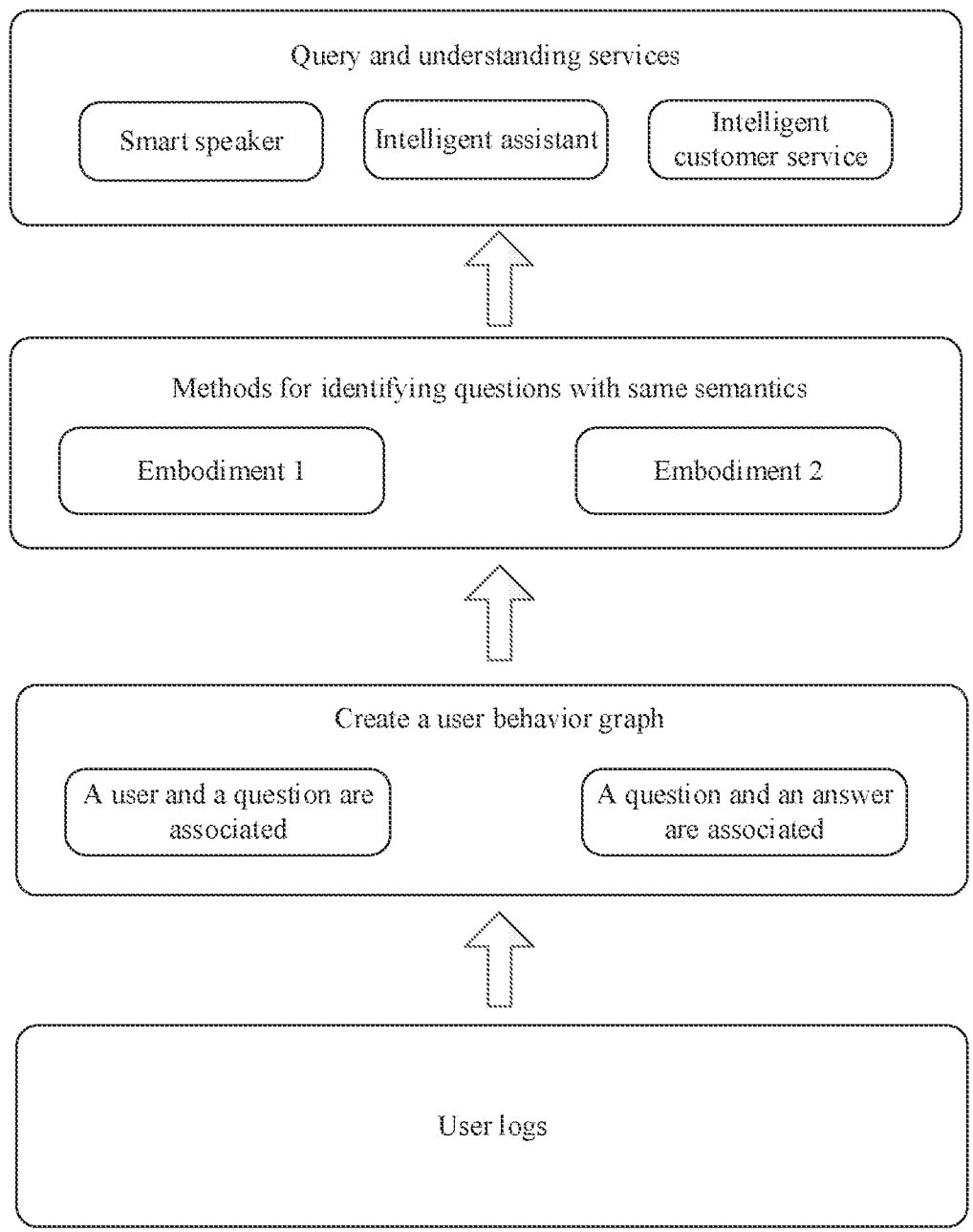
FIG. 6 is a schematic diagram of a specific application scenario according to this application.

FIG. 6 is a schematic diagram of a specific application scenario according to an embodiment of this application. An electronic device first creates a user behavior graph based on at least two user logs, for example, as shown in FIG. 1(a). The user behavior graph may be used to describe an association relationship between a user and a question and an association relationship between a question and an answer. The electronic device may determine a plurality of questions with same or similar semantics according to the methods for identifying questions with same semantics provided in Embodiment 1 and Embodiment 2, for example, determine K questions with top K association scores by using the method shown in Embodiment 1 or Embodiment 2. The K questions with the top K association scores have same or similar semantics. Further, the foregoing identification result, namely, the plurality of questions with same or similar semantics, may be applied to a device or software such as a smart speaker, an intelligent assistant, or an intelligent customer service, to improve semantic understanding capabilities of these devices or software, so that a more accurate answer is provided for a user, thereby improving user experience.

In embodiments provided in this application, the method provided in embodiments of this application is described from the perspective in which the electronic device serves as an execution body. To implement the functions in the method provided in embodiments of this application, the electronic device may include a hardware structure and/or a software module, to implement the functions in a form of the hardware structure, the software module, or a combination of the hardware structure and the software module. Whether a function in the foregoing functions is performed by the hardware structure, the software module, or the combination of the hardware structure and the software module depends on specific applications and design constraints of the technical solutions.

Figure 7:
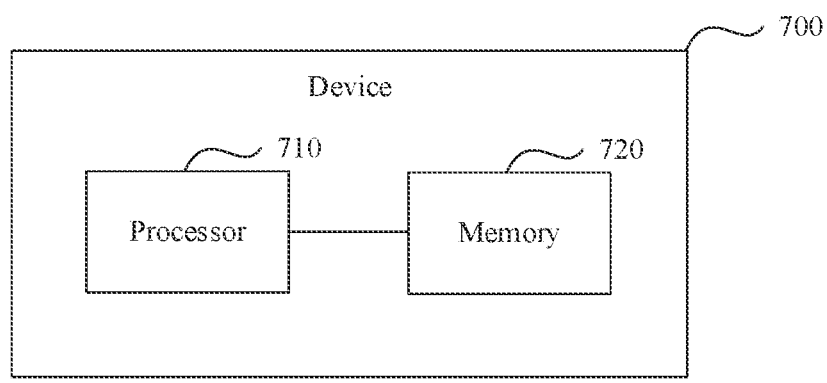
FIG. 7 is a schematic diagram of a structure of an electronic device according to this application.

Based on a same concept, FIG. 7 shows a device 700 according to this application. The device 700 is configured to perform the method for identifying questions with same semantics shown in FIG. 4 or FIG. 5. The device 700 includes at least one processor 710 and a memory 720. The processor 710 is coupled to the memory 720. The coupling in this embodiment of this application is an indirect coupling or a communication connection between apparatuses, units, or modules, may be in an electrical, mechanical, or another form, and is used for information exchange between the apparatuses, units, or modules. In this embodiment of this application, a connection medium between the processor 710 and the memory 720 is not limited. For example, in this embodiment of this application, in FIG. 7, the memory 720 and the processor 710 may be connected by using a bus, and the bus may be classified into an address bus, a data bus, a control bus, and the like.

Specifically, the memory 720 is configured to store program instructions.

The processor 710 is configured to invoke the program instructions stored in the memory 720, so that the device 700 performs the method for identifying questions with same semantics shown in FIG. 4 or FIG. 5.

In this embodiment of this application, the processor 710 may be a general-purpose processor, a digital signal processor, an application-specific integrated circuit, a field programmable gate array or another programmable logic component, a discrete gate or transistor logic component, or a discrete hardware component, and can implement or perform the methods, steps, and logical block diagrams disclosed m embodiments of this application. The general-purpose processor may be a microprocessor, any conventional processor, or the like. The steps of the methods disclosed with reference to embodiments of this application may be directly performed by a hardware processor, or may be performed by using a combination of hardware in the processor and a software module.

In this embodiment of this application, the memory 720 may be a nonvolatile memory, for example, a hard disk drive (hard disk drive, HDD) or a solid-state drive (solid-state drive, SSD); or may be a volatile memory (volatile memory), for example, a random access memory (random access memory, RAM). The memory is any other medium that can be configured to carry or store expected program code in a form of an instruction or a data structure and that can be accessed by a computer, but is not limited thereto. The memory in this embodiment of this application may alternatively be a circuit or any other apparatus that can implement a storage function, and is configured to store program instructions and/or data.

It should be understood that the device 700 may be configured to implement the methods shown in FIG. 4 and FIG. 5 in embodiments of this application. For related characteristics, refer to the foregoing descriptions. Details are not described herein again.

A person skilled in the art may clearly understand that embodiments of this application may be implemented by using hardware, firmware or a combination thereof. When embodiments of this application are implemented by using the software, the foregoing functions may be stored in a computer-readable medium or transmitted as one or more instructions or code in a computer-readable medium. The computer-readable medium includes a computer storage medium and a communications medium. The communications medium includes any medium that facilitates transmission of a computer program from one place to another. The storage medium may be any available medium accessible by a computer. This is used as an example but is not limited to: The computer-readable medium may include a RAM, a ROM, an electrically erasable programmable read-only memory (electrically erasable programmable read-only memory, EEPROM), a compact disc read-only memory (compact disc read-only memory, CD-ROM) or another compact disc storage, a magnetic disk storage medium or another magnetic storage device, or any other medium that can be configured to carry or store expected program code in a form of an instruction or a data structure and that can be accessed by a computer. In addition, any connection may be appropriately defined as a computer-readable medium. For example, if the software is transmitted from a website, a server, or another remote source through a coaxial cable, an optical fiber and optical cable, a twisted pair, a digital subscriber line (digital subscriber line, DSL), or wireless technologies such as infrared, radio, and microwave, the coaxial cable, the optical fiber and optical cable, the twisted pair, the DSL, or the wireless technologies such as the infrared, the radio, and the microwave are included in a definition of a medium to which the coaxial cable, the optical fiber and optical cable, the twisted pair, the DSL, or the wireless technologies such as the infrared, the radio, and the microwave belong. A disk (disk) and a disc (disc) that are used in embodiments of this application include a compact disc (compact disc, CD), a laser disc, an optical disc, a digital video disc (digital video disc, DVD), a floppy disk, and a Blu-ray disc. The disk usually magnetically copies data, and the disc optically copies data by using laser. The foregoing combination should also be included in the protection scope of the computer-readable medium.

In conclusion, the foregoing descriptions are merely embodiments of this application, but are not intended to limit the protection scope of this application. Any modification, equivalent replacement, or improvement made according to the disclosure of this application shall fall within the protection scope of this application.

What is claimed is:

1. A method, comprising:
    creating, based on at least two user logs, a user behavior graph, wherein each user log comprises at least one user identifier, at least one question, and at least one answer corresponding to each question, wherein in the user behavior graph, an $i^{th}$ user node corresponds to a user identifier in an $i^{th}$ user log, wherein the $i^{th}$ user node is separately connected to at least one question node, wherein the at least one question node corresponds to at least one question in the $i^{th}$ user log, wherein a $j^{th}$ question node in the at least one question node is separately connected to at least one answer node, wherein the at least one answer node corresponds to at least one answer that is in the $i^{th}$ user log and that corresponds to the $j^{th}$ question node, wherein i and j are positive integers, wherein the $i^{th}$ user log is any one of the at least two user logs, and wherein the $j^{th}$ question node is any one of the at least one question node;
    obtaining, based on the user behavior graph and a seed question, a first associated question node set, wherein the first associated question node set comprises a question node corresponding to the seed question and M associated question nodes, wherein M is a positive integer, and wherein the seed question is a question in the at least two user logs;
    calculating, based on the first associated question node set, association scores of questions corresponding to all question nodes in the user behavior graph;
    using a question corresponding to each associated question node in the first associated question node set as a new seed node to obtain M second associated question node sets;
    updating, based on the M second associated question node sets, the association scores to produce updated association scores; and
    obtaining, based on the updated association scores, K questions with top K association scores,
    wherein K is an integer greater than 1.

2. The method of claim 1, wherein the user behavior graph further comprises a value marked on a first edge connecting each question node and a corresponding answer node, wherein a value marked on a second edge connecting the $j^{th}$ question node and an $n^{th}$ answer node represents a quantity of times of using an answer corresponding to the $n^{th}$ answer node to answer a question corresponding to the $j^{th}$ question node, wherein n is a positive integer, and wherein the $n^{th}$ answer node is any one of the at least one answer node.

3. The method of claim 1, wherein obtaining the first associated question node set further comprises:
    obtaining, based on the user behavior graph, a first associated answer node set, wherein the first associated answer node set comprises at least one answer node connected to the question node corresponding to the seed question; and
    using, as an associated question node, a second question node other than the question node corresponding to the seed question to obtain the M associated question nodes.

4. The method of claim 3, wherein an association score of a question corresponding to a first question node is calculated based on a value marked on a first edge connecting the question node corresponding to the seed question and each answer node in the first associated answer node set and a value marked on a second edge connecting the first question node and a first associated answer node, wherein in the first associated question node set, the first question node is any associated question node in the first associated question node set, and wherein the first associated answer node is connected to the question node corresponding to the seed question and is connected to the first question node.

5. The method of claim 1, wherein updating the association scores to produce the updated association scores further comprises updating, based on the association scores, the association scores to produce the updated association scores.

6. The method of claim 1, wherein before obtaining the K questions, the method further comprises identifying that a difference between an updated association score of each question and an association score that is of each question and that exists before the update is less than a preset threshold.

7. An apparatus, comprising:
    one or more processors; and
    a memory coupled to the one or more processors, wherein the memory is configured to store code, wherein when the code is executed by the one or more processors, the apparatus is configured to:
        create, based on at least two user logs, a user behavior graph, wherein each user log comprises at least one user identifier, at least one question, and at least one answer corresponding to each question, wherein in the user behavior graph, an $i^{th}$ user node corresponds to a user identifier in an $i^{th}$ user log, wherein the $i^{th}$ user node is separately connected to at least one question node, wherein the at least one question node corresponds to at least one question in the $i^{th}$ user log, wherein a $j^{th}$ question node in the at least one question node is separately connected to at least one answer node, wherein the at least one answer node corresponds to at least one answer that is in the $i^{th}$ user log and that corresponds to the $j^{th}$ question node, wherein i and j are positive integers, wherein the $i^{th}$ user log is any one of the at least two user logs, and wherein the $j^{th}$ question node is any one of the at least one question node;

obtain, based on the user behavior graph and a seed question, a first associated question node set, wherein the first associated question node set comprises a question node corresponding to the seed question and M associated question nodes, wherein M is a positive integer; and wherein the seed question is a question in the at least two user logs;

calculate, based on the first associated question node set, association scores of questions corresponding to all question nodes in the user behavior graph;

use a question corresponding to each associated question node in the first associated question node set as a new seed node to obtain M second associated question node sets;

update, based on the M second associated question node sets, the association scores to produce updated association scores; and obtain, based on the updated association scores, K questions with top K association scores, wherein K is an integer greater than 1.

8. The apparatus of claim 7, wherein the user behavior graph further comprises a value marked on a first edge connecting each question node and a corresponding answer node, wherein a value marked on a second edge connecting the $j^{th}$ question node and an $n^{th}$ answer node represents a quantity of times of using an answer corresponding to the $n^{th}$ answer node to answer a question corresponding to the $j^{th}$ question node, wherein n is a positive integer, and wherein the $n^{th}$ answer node is any one of the at least one answer node.

9. The apparatus of claim 7, wherein the apparatus is configured to obtain the first associate question node set by:
obtaining, based on the user behavior graph, a first associated answer node set, wherein the first associated answer node set comprises at least one answer node connected to the question node corresponding to the seed question; and
using, as an associated question node, a second question node other than the question node corresponding to the seed question to obtain the M associated question nodes.

10. The apparatus of claim 9, wherein an association score of a question corresponding to a first question node is calculated based on a value marked on a first edge connecting the question node corresponding to the seed question and each answer node in the first associated answer node set and a value marked on a second edge connecting the first question node and a first associated answer node, wherein in the first associated question node set, the first question node is any associated question node in the first associated question node set, and wherein the first associated answer node is connected to the question node corresponding to the seed question and is connected to the first question node.

11. The apparatus of claim 7, wherein the apparatus is further configured to update the association scores to produce the updated association scores by updating, based on the association scores, the association scores to produce the updated association scores.

12. The apparatus of claim 7, wherein before the apparatus is configured to obtain the K questions, the apparatus is configured to identify that a difference between an updated association score of each question and an association score that is of each question and that exists before the update is less than a preset threshold.

13. A computer program product comprising computer-executable instructions stored on a non-transitory computer-readable medium that, when executed by one or more processors, cause an apparatus to:

create, based on at least two user logs, a user behavior graph, wherein each user log comprises at least one user identifier, at least one question, and at least one answer corresponding to each question, wherein in the user behavior graph, an $i^{th}$ user node corresponds to a user identifier in an $i^{th}$ fuser log, wherein the $i^{th}$ user node is separately connected to at least one question node, wherein the at least one question node corresponds to at least one question in the $i^{th}$ user log, wherein a $j^{th}$ question node in the at least one question node is separately connected to at least one answer node, wherein the at least one answer node corresponds to at least one answer that is in the $i^{th}$ user log and that corresponds to the $j^{th}$ question node, wherein i and j are positive integers, wherein the $i^{th}$ user log is any one of the at least two user logs, and wherein the $j^{th}$ question node is any one of the at least one question node;

obtain, based on the user behavior graph and a seed question, a first associated question node set, wherein the first associated question node set comprises a question node corresponding to the seed question and M associated question nodes, wherein M is a positive integer; and wherein the seed question is a question in the at least two user logs;

calculate, based on the first associated question node set, association scores of questions corresponding to all question nodes in the user behavior graph;

use a question corresponding to each associated question node in the first associated question node set as a new seed node to obtain M second associated question node sets;

update, based on the M second associated question node sets, the association scores to produce updated association scores; and obtain, based on the updated association scores, K questions with top K association scores, wherein K is an integer greater than 1.

14. The computer program product of claim 13, wherein the user behavior graph further comprises a value marked on a first edge connecting each question node and a corresponding answer node, wherein a value marked on a second edge connecting the $j^{th}$ question node and an $n^{th}$ answer node represents a quantity of times of using an answer corresponding to the $n^{th}$ answer node to answer a question corresponding to the $j^{th}$ question node, wherein n is a positive integer, and wherein the $n^{th}$ answer node is any one of the at least one answer node.

15. The computer program product of claim 13, wherein the one or more processors are further configured to execute the instructions to cause the apparatus to obtain the first associate question node set by:

obtaining, based on the user behavior graph, a first associated answer node set, wherein the first associated answer node set comprises at least one answer node connected to the question node corresponding to the seed question; and using, as an associated question node, a second question node other than the question node corresponding to the seed question to obtain the M associated question nodes.

16. The computer program product of claim 15, wherein an association score of a question corresponding to a first question node is calculated based on a value marked on a first edge connecting the question node corresponding to the seed question and each answer node in the first associated answer node set and a value marked on a second edge connecting the first question node and a first associated answer node, wherein in the first associated question node set, the first question node is any associated question node in the first associated question node set, and wherein the first associated answer node is connected to the question node corresponding to the seed question and is connected to the first question node.

17. The computer program product of claim 13, wherein the one or more processors are further configured to execute the instructions to cause the apparatus to update the association scores to produce the updated association scores by updating, based on the association scores, the association scores to produce the updated association scores.

18. The computer program product of claim 13, wherein before obtaining the K questions, the one or more processors are further configured to execute the instructions to identify that a difference between an updated association score of each question and an association score that is of each question and that exists before the update is less than a preset threshold.

19. The computer program product of claim 13, wherein the at least two user logs are from users accessing the Internet.

20. The computer program product of claim 19, wherein the at least two user logs comprise accessing, browsing, searching, and tapping data.

\* \* \* \* \*